July 8, 1952 G. B. GLASS ET AL 2,602,446
AUTOMATIC MEDICAL INJECTION APPARATUS
Filed Feb. 27, 1950 4 Sheets-Sheet 1
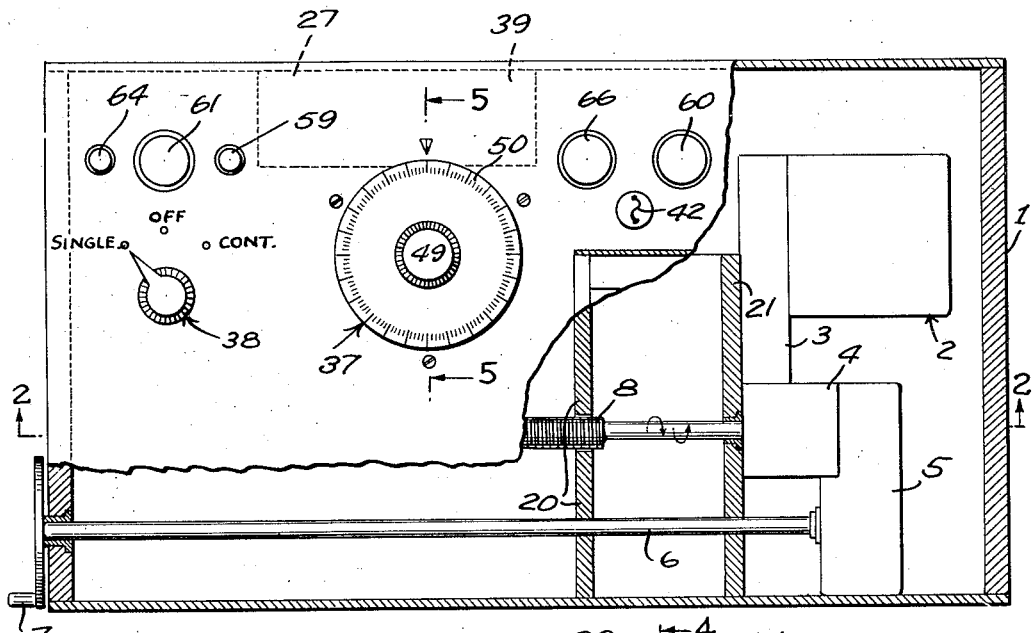
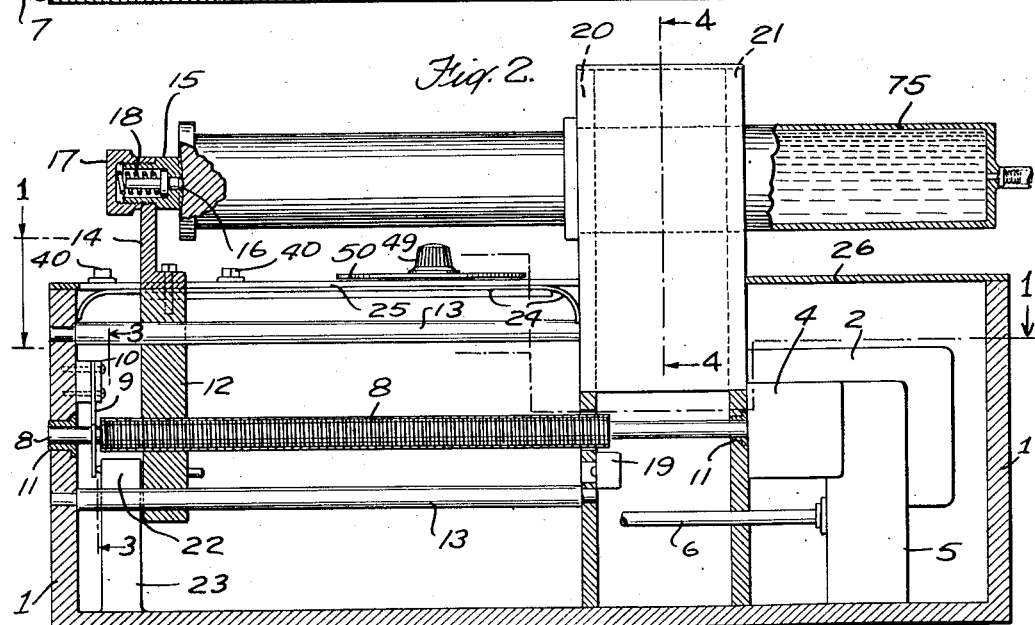
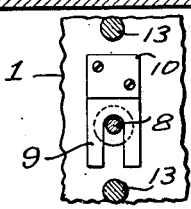
Inventors
GEORGE B. GLASS
JERZY I. BANDROWSKI
ZBISLAW M. ROEHR
By
Attorney July 8, 1952  G. B. GLASS ET AL  2,602,446
AUTOMATIC MEDICAL INJECTION APPARATUS
Filed Feb. 27, 1950  4 Sheets-Sheet 2
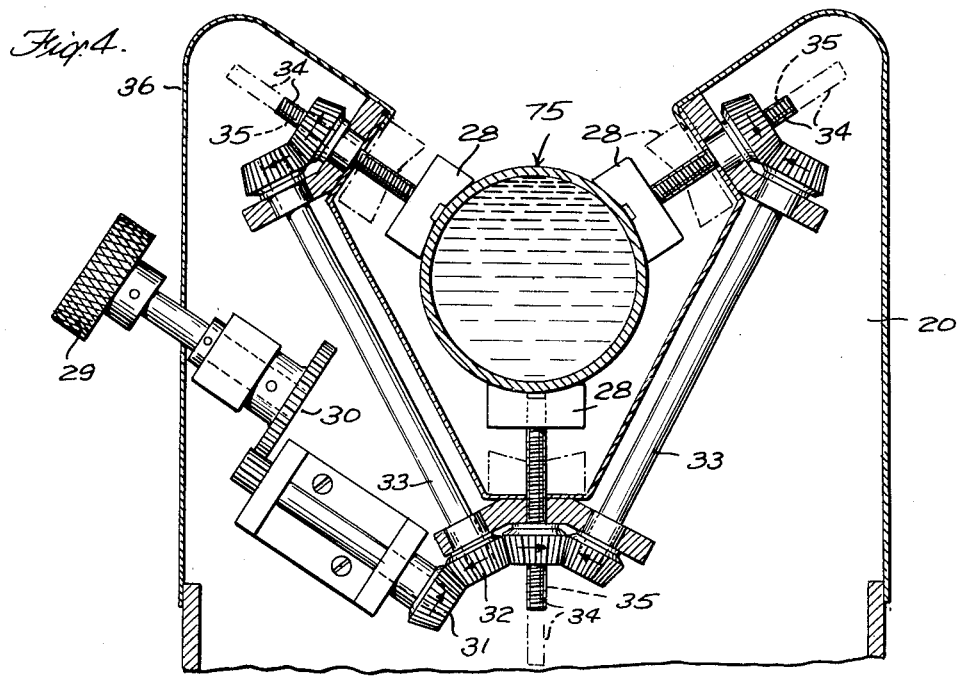
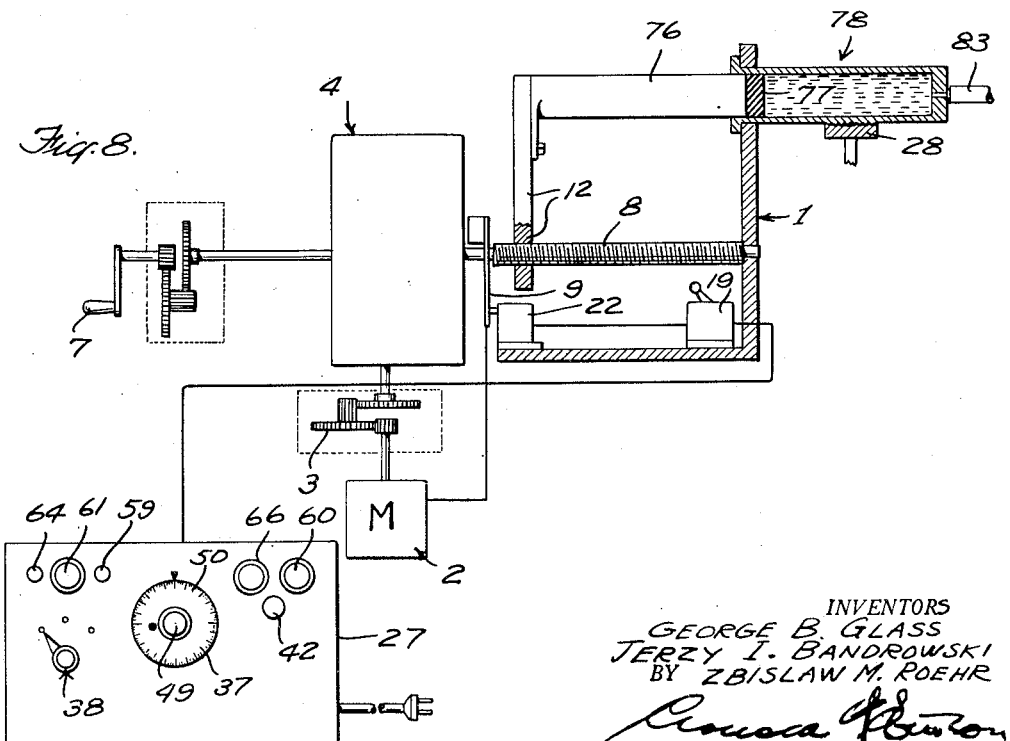
INVENTORS
GEORGE B. GLASS
JERZY I. BANDROWSKI
BY ZBISLAW M. ROEHR
ATTORNEY.

July 8, 1952 G. B. GLASS ET AL 2,602,446
AUTOMATIC MEDICAL INJECTION APPARATUS
Filed Feb. 27, 1950 4 Sheets-Sheet 3

Inventors
GEORGE B. GLASS
JERZY I. BANDROWSKI
ZBISLAW M. ROEHR

Attorney

Inventors
GEORGE B. GLASS
JERZY I. BANDROWSKI
ZBISLAW M. ROEHR

Patented July 8, 1952

2,602,446

UNITED STATES PATENT OFFICE 2,602,446

AUTOMATIC MEDICAL INJECTION APPARATUS

George B. Glass, Jerzy I. Bandrowski, and Zbislaw M. Roehr, New York, N. Y., assignors to Antonina S. Glass, New York, N. Y.

Application February 27, 1950, Serial No. 146,552

11 Claims. (Cl. 128—218)

This invention relates to a motor driven medical injection apparatus, and more particularly to such a device including means for effecting the automatic injection of precise amounts of medicaments or fluids over predetermined periods which may be of a periodic character.

In medical therapy, particularly in modern practice, occasions arise when application of medicaments, in the form of fluid solutions, is required to be carried out over relatively extended periods of time, as in the parenteral administration of saline, plasma, glucose and other solutions. On other occasions, it is necessary to administer certain injections to a large number of subjects, as is the case in treatments undertaken by military authorities, industrial enterprises, or for civil populations. In all such cases, the familiar hand syringe hypodermic application involves undue multiplication of work and requires repetitious and tedious adjustments for each individual case, as well as calling for refill and replacement operations requiring undue time in view of the total number of injections, or the time for any given injection which may be required.

It is an object of the present invention to provide an automatic medicament injection device which permits an injection to take place over predetermined extended periods of time.

It is another object to provide an injection device of the type described which is capable of administering, substantially automatically, with due supervision, a continual form of injection requiring precisely measured quantities of fluid for each injection.

It is a further object to provide a motor driven medical injection device which has the flexibility of control permitting exactly controlled continual and extended injections, repetitious and intermittent injections, as well as single individual injections to any number of subjects from the same supply, as required.

A still further object is to provide an injection device wherein the quantity to be injected for each working cycle may be adjusted in advance with great precision, and which may be set in advance for one or a given number of repeat cycles.

It is still another object to provide a medicament injection device which is capable of supplying an intermittent or a continual type of injection wherein the rate of flow of the fluid may be kept constant for a predetermined period of time.

In accordance with certain features of the invention, there is provided an injection device which includes a holder for a syringe or cartridge type medicinal fluid container, the container or syringe barrel being provided with pressure responsive discharging means such as a piston, in the case of a syringe or a movable plug or stopper in the case of a cartridge, as is generally common in commercial articles of this kind. The device, in accordance with our invention, includes a mechanism for effecting the propulsion of the pressure-responsive discharge means for the fluid container, held in the syringe or barrel holder, and which is preferably actuated by an electric motor drive. The quantity of fluid to be injected by the syringe as a function of the movement of the piston drive, may be controlled by means of a timing control, with respect to the working cycle of the piston, which forms a part of the motor circuit. Provision has been made for selecting a continual, periodic or single application type of operation for the device by means of suitable selector and control circuits.

In accordance with another feature of the invention, we have incorporated a manual actuation for effecting a forward movement of the piston actuator, as well as its retraction by hand in order to be able quickly to repeat a whole injection working stroke.

In accordance with still another feature, it is also possible to provide for a full cycle injection in a given cycle, regardless of the setting of the cycle timing control.

These and other objects and features will become better understood from the following detailed description and by reference to the accompanying drawings, of which:

Fig. 1 is a top plan view with certain parts broken away, of the device in accordance with our invention;

Fig. 2 is a vertical longitudinal section taken on line 2—2 of Fig. 1;

Fig. 3 is a fragmentary view taken on line 3—3 of Fig. 2;

Fig. 4 is an enlarged fragmentary section taken on line 4—4 of Fig. 2;

Fig. 8 is a representation in functional form of the device as a whole, a cartridge being indicated in place of the syringe shown in the Fig. 2.

Figure 5:
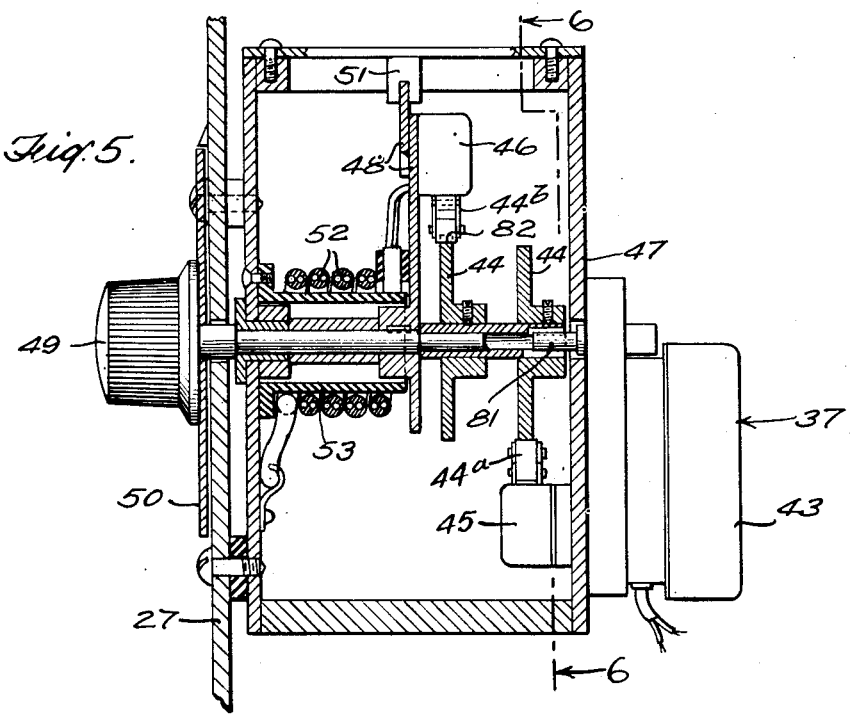
Fig. 5 is a view in partial cross-section of a timing control motor mechanism to be used with the injection device.

Referring now to the drawings, where similar parts will be designated with similar references, we have shown a housing 1 wherein there is mounted an electric motor 2, adapted through the medium of reduction gearing 3 to drive a set of differential gears at a low speed represented at 4 and so arranged as to effect the rotation, upon energization of motor 2, of a lead screw 8. The lead screw 8 is shown to be mounted in journal type bearings 11, respectively disposed in the housing wall and a partition 21 adjacent to the differential gear set 4.

There is provided intermediate the lead screw 8 and the journal bearing 11 in the housing wall, an additional thrust bearing in the form of a fork-shaped leaf spring 9 secured to the housing by means of plate members 10. The arrangement of the leaf spring 9 is such that it will yield upon sufficient pressure applied to the lead screw 8 in the axial direction to permit a limited axial movement thereof. The movement of the leaf spring 9 acts to operate a safety or limit switch indicated at 22 and supported in the housing by means of a bracket element 23. The purpose of the thrust pressure limit switch will become apparent as the description progresses. The amount of deflection of the spring 9 for a given thrust may be adjusted by selecting the proper thickness therefor and by varying the distance of the limit switch 22 from the leaf spring 9.

The lead screw 8 is provided with a travelling nut member 12 adapted to be reciprocated along the said lead screw due to the coaction of threads between the nut 12 and the screw 8 as the latter is rotated. The member 12 is maintained in its path by means of guide members 13 extending parallel to the lead screw and passing through suitably arranged apertures in the upper and lower portions of the nut member 12. The nut 12 has an extension or bracket 14 outside of the housing 1 which is adapted to carry a piston centering and pushing mechanism including a pusher housing 15, wherein there is mounted for reciprocating movement a pin 16. The pusher housing 15 is closed off on its apertured side by means of a closing member 17 in order to permit a spring 18 to be mounted therewithin and the pin 16 to be resiliently held thereby. A smooth contact is thereby made possible between the pusher and the piston of the syringe. The pin 16 is shown contacting the piston of a syringe.

A provision has been made for the manual actuation of the piston moving mechanism, the nut 12 and the piston centering device 15—17, by means of a manually operable crank 7 mounted on an auxiliary shaft 6 extending through the housing in parallel relationship to the lead screw 8 and mechanically linked to the differential gearing 4 through suitable speed control gearing 5. A forward and backward movement by hand, regardless of the state of operability of the motor 2 is thus made possible due to the presence of the differential gear linkage between the motor 2 and the manual drive 7—6.

For the purpose of protecting the mechanism as well as to be able to exercise a control over the termination of the working stroke of the piston drive, there has been included a forward drive or overtravel limit switch indicated at 19, arranged in the main motor circuit, and which becomes operative upon the nut member 12 reaching the forwardmost position intended therefor. The limit switch 19 is disposed adjacent the partition 20 in a position substantially corresponding to the end of the lead screw 8. Both limit switches 19 and 22 are normally closed.

To permit the reciprocal movement of the member 12 with its extension 14 and pusher housing 15, the housing cover 26 is suitably slotted. In order to protect the interior of the housing and the mechanism contained therein from fluid which may drip from the syringe or cartridge, a movable or sliding flexible slot cover member 24 is provided to move in guide 25 of housing 26 together with the nut 12 thereby constantly presenting a closed surface toward the piston and syringe. The nut 12 may be suitably offset with respect to the lead screw to permit free movement of slide 24.

A syringe of cartridge holding or centering mechanism is indicated as disposed between wall portions 20 and 21 on housing 1 in Fig. 1 and is shown in greater detail in a section thereof in Fig. 4. The syringe or cartridge centering mechanism is of the triple jaw or grip type. It comprises the three jaws shown at 28 adapted concentrically to engage the main cylindrical body or barrel portion 75 of the syringe or cartridge. Before the placement of the syringe or cartridge into the centering mechanism, the upper jaws 28 are moved sufficiently far apart to permit the placement of the syringe therebetween and on top of the lowermost of the three jaws. The retracted position of the jaws 28 is indicated in dotted lines in Fig. 4. In order to effect an engagement of the jaws with the body portion 75 of the syringe or cartridge, an actuator knob 29 is rotated, and, through the gears shown at 30, actuates bevel gears 31 and 32 as well as the two shafts 33, arranged in V formation. The rotation of gears 31 and 32 causes the respective axial movement of lead screws 34 which in turn serve to effect a simultaneous movement toward the center of the body portion 75 of the syringe or cartridge of the three jaws 28. Two guide rods 35 may be provided for each of the jaws 28 in order to take up the axial thrust of the syringe upon the jaws. The centering device as a whole is enclosed by a cover member 36 which may be in the form of a metal band. The self-centering mechanism, in practice, is suitable for syringes having a wide range of diameters.

In the schematic layout shown in Fig. 8 the pusher member 12—14—15 has been replaced with a horizontally extending piston arm 76 for direct engagement with the internally movable plug or plunger 77 of an ampule or cartridge type container generally indicated at 78. The cartridge 78 is supported in a holding or centering mechanism which may be of the triple jaw type described above with reference to Fig. 4, or it may take other appropriate form, as for instance the screw-threaded or bayonet-slotted arrangement described and claimed in copending patent application Serial No. 146,551 filed by George B. Glass, one of the inventors of the present invention, of even date herewith. In this case, as described in the aforesaid copending application, the rear barrel portion of the cartridge is either itself externally screw-threaded or bayonet-slotted or is enclosed in a casing having such a cooperative attaching formation. The cartridge is provided with a flexible extension conduit 83 for conveying the fluid to a point of injection relatively remote from the apparatus, and the remote end of said conduit is provided with means for detachably securing a hypodermic needle thereto, all as more particularly described in the aforesaid copending application Serial No. 146,551 of George B. Glass.

In the views of Figures 1 and 8, there is indicated the arrangement of certain of the important electrical components which will be described in greater detail hereinbelow. The portion of the housing shown at 27 has mounted thereon a dual timer control 37, a selector switch 38, controlling relays indicated in broken lines at 39 within the housing, two push buttons 59, 64, three pilot lights 60, 61, 66, and a fuse 42.

Figure 6:
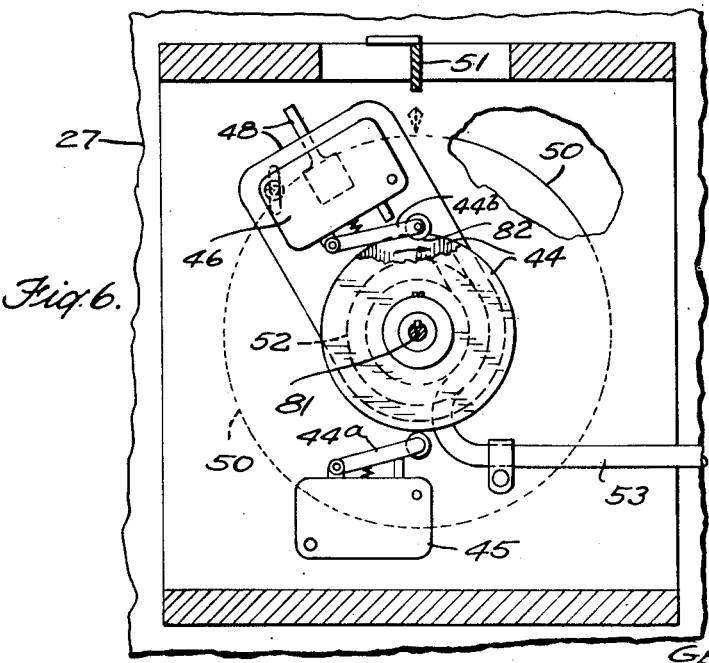
Fig. 6 is a section taken on line 6—6 of Fig. 5.

The timing motor is indicated at 43 in Fig. 5. Through a suitable speed reduction, for instance, to as low as 2 R. P. M., the output shaft 81 of the timing motor 43 is made to rotate two cams 44, each provided with a suitably designed recess or groove 82 on its peripheral portion (Fig. 6), whereby cam followers 44a and 44b of limit switches 45 and 46 are adapted to be released into grooves 82 due to spring pressure, thereby tripping switches 45 and 46. The switch 45 is fixedly mounted on the timer housing 47, while the switch 46 is secured on a movable arm 48, the position of which may be rotatably adjusted by means of a knob 49 on the outside of the housing portion 27. A graduated dial 50 is attached to the knob 49 whereby the degree or percentage of adjustment of the movable switch 46 in respect to the total working cycle may be preset. A stop element 51 within the timer housing 47 serves to limit the rotation adjustment of the switch 46 to substantially one complete revolution of the knob 49. A conducting wire or cable 52 coiled around a split insulating guard 53 serves to provide an electrical connection between the stationary electrical components of the housing 47 and the movable arm 48. It is to be understood that two timers, functioning either in cooperation or independently may be used in place of the single timer here described.

Figure 7:
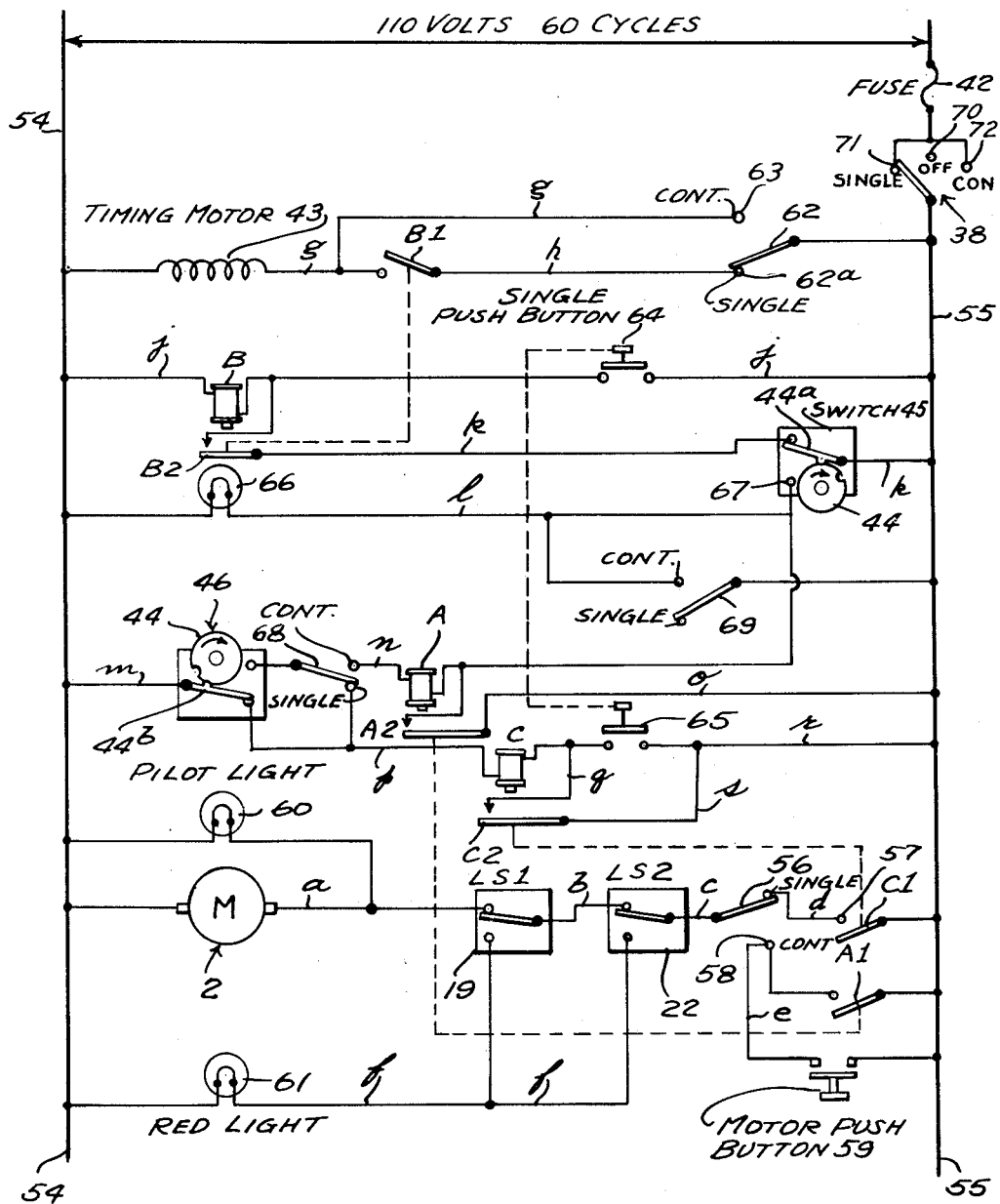
Fig. 7 is an across-the-line wiring diagram of the motor and control circuits of the injection device.

An explanation will now be given with reference to Fig. 7, of the electrical circuits which make up the various controls indicated hereinabove. An electric power supply which may furnish energy at, say, 110 volts, 60 cycles, is indicated by lines 54 and 55. Selector switch 38, which is of the multicircuit type, comprises switch arms 56, 62, 68 and 69, and is shown in the line 55. A multicircuit several-position selector switch 38 is used for controlling the operativeness of the injection device. These positions are designated in Figs. 1 and 7 as Off, Single and Continual. These three positions are represented at 70, 71, and 72. The main driving motor 2 is connected across lines 54 and 55 in part through the two limit switches 19 and 22 (circuit 54–a–b–c–d–55). The final connection from the switch 22 to the line 55 may be provided to the motor 2 through a switch member 56 in the Single cycle operative position of the selector switch 38 at 57 through normally open relay contact C₁. Another connection to the line 55 may be made through switch 56, the Continual operation contact 58 and a normally open relay contact A₁.

A main motor push button 59, which may be a foot switch, also provides a connection to the line 55 through switch 56 in the Continual operation position (circuit 55–e) as a by-pass for contact A₁.

Upon energization of the main motor circuit, an "Injection" pilot light 60 will also become energized. The light 60 is connected across the motor terminals. Another pilot light 61, preferably having a red color, is connected to limit switches 19 and 22 (circuit line f) such that the tripping of the main motor circuits (54–a–b–c–d–55 or 54–a–b–c–e–55) by either of the two switches 19 and 22, will cause energization thereof.

The timer motor 43 is energized from lines 54 and 55 (54–g or h–55) by switch arm 62 in the Single position at 62a through a normally open relay contact B₁. In the Continual operation position of the selector switch at 63, the contact B₁ is by-passed so that an immediate operation of the timer motor (circuit 54–g–55) may take place upon the selector switch 38 being turned to the Continual operation position. In order to initiate the operation of the timer in the Single injection position of the selector switch 38, Single push button 64 establishes a circuit (54–j–j–55) across the lines for a relay B whereby contact B₁ is closed and the timer motor 43 becomes energized. At the same time, another part of the Single push button 64 closes a circuit (54–m–p–q–r–55) between lines 54 and 55 at 65 which includes a relay C and the adjustable timing switch 46. It is thus seen that the contact C₁ and the main motor circuit (54–a–b–c–d–55) is closed by the momentary actuation of the Single push button 64.

The operation of relay B also closes the holding contact therefor, B₂, whereby it becomes possible to release the push button 64 without de-energizing the relay B. Upon release of the Single push button 64, the energizing circuit (54–j–k–55) for relay B also includes the fixed timing switch 45. The closing of the energizing circuit for relay C at 65 also causes the relay to close its own holding contact C₂, whereby the relay C remains energized upon release of push button 64. It will be noted that upon tripping of the fixed timing switch 45 due to its follower 44a falling into the recess of its associated cam 44, a circuit will be established at contact 67 for a "Ready" pilot light shown at 66.

In the Continual operation position of the selector switch 38, the selector switch arm 68, upon the tripping of the fixed timing switch 45 to position 67, will provide an energizing potential for relay A, causing the closing of its normally open contact A₁ and its holding contact A₂. The selector switch arm controlling the connection from the adjustable timing switch to relays A and C is shown at 68. In the Continual operation position of the selector switch arm 69, a circuit is immediately provided for the "Ready" pilot light 66 across the lines without the intermediary of the contact 67 of the fixed timer switch 45. The main selector switch 38 is shown respectively controlling Continual, Off, and Single operations contacts 70, 71 and 72, in the main line 55 which also contains the fuse 42. The switch arms 62, 69, 68 and 56 form the single unit selector shown at 38.

In the operation of the device, as illustrated in Figs. 1–8, a suitably proportioned syringe or cartridge containing the quantity of fluid medicament required as inserted into the syringe or cartridge holding mechanism by placing it upon the lowermost of the three jaws 28 such that the piston, in the case of a syringe, after the syringe has been firmly retained within the jaws 28 by manipulation of the knot 29, is properly in line to be actuated over its full working stroke by means of the piston driving or pushing mechanism 14—15—16. In the case when a cartridge is used as illustrated in Fig. 8, the extension pusher arm 76 is set in operative alignment with the plunger 77 of the cartridge 78. The fluid contained in the cylinder of the syringe or cartridge is preferably sufficient for one or more individual injection applications. The exact amount of fluid to be ejected by the piston is predetermined by a setting of the dial 50 attached to knob 49. The amount of fluid ejected by the piston will of course depend also upon the particular volume of the syringe or cartridge used in accordance with well known methods of calculation. Pre-calibration of the syringe barrel or ampule by the manufacture, which is common, will facilitate the calculation in question.

Depending upon the type of injection desired, the proper controls are now pre-set. Thus, for instance, if a so-called Continual type of injection is deired, the selector switch 38 is turned from its normal Off position to the position indicated as Continual. As already explained with reference to the wiring diagram of Fig. 7, the setting of the selector switch to this position will place in readiness the respective circuits for permitting the timing motor 43 to operate. Thus, upon the initial energization of the "Ready" pilot light 66, the rotation of the timer motor 43 will effect a tripping of the fixed timer switch 45 to a position connecting its arm to contact 67, whereby relay A is energized, closing its holding contact $A_2$ and the main motor controlling contact $A_1$. It is assumed that before starting the operation, by turning to the Continual position of the selector switch, the proper adjustment has been made in the position of the adjustable timer switch 46 by manipulation of the knob 49 which determines the duration of the working cycle of the piston per cycle of the timing motor whereby the amounts of fluid per cycle to be delivered is controlled.

The driving motor 2 is now operable and acts to effect the propulsion of the piston of the syringe. It should be noted that upon closure of the main motor circuit, the pilot light 60 also becomes energized indicating that the injection is proceeding. The driving motor 2 will continue operating until the timing motor 43 has turned sufficiently to open the motor circuit by the tripping of the adjustable timer switch 46 whereby the circuit through the relay A is broken and the contact $A_1$ is opened up, thereby de-energizing the driving motor. The timing motor 43, continuing to rotate, actuates the two cams 44 so that the two switches 45 and 46 are immediately closed again, the respective followers 44a and 44b being lifted out of their respective recesses thereby. As the timing motor rotates, the fixed timing switch 45 is again tripped into position for making the contact with 67, again as before re-establishing the main motor circuit energizing relay A. The energization of driving motor 2, after having thus been re-established, is again interrupted as the adjustable timing switch 46 is tripped by its associated recess 44b in accordance with the presetting by means of the knob 49. Continual and cyclic operation of the device, and thereby of the periodically repeated measured injections is thus obtained.

If during the operation, the fluid being ejected is subject to excessive counter pressure, due to mechanical obstacles in general, as by clogging of the needle, twisting of tubing, sticking of pistons or impingement upon hard tissue or bone, such counter pressure is translated into an equivalent axial thrust upon the lead screw 8 through the medium of the fluid, the piston and the piston drive. This axial thrust is then communicated to the leaf type spring 9 breaking the connection through limit switch 22 and de-energizing the motor 2. The leaf spring is so designed that it may be set for any desired value of thrust to be expected.

In case of need, as when it is desired to increase the flow of fluid, the actuation of the motor push button 59 which by-passes the relay contact $A_1$, serves to keep the driving motor 2 energized beyond the time of its de-energization as determined by the adjustable timer switch 46.

The movement of the travelling nut member 12 toward the wall 20 will eventually operate the release of the motor circuit control switch 19 whereby mechanical safety for the apparatus is attained. Upon either of the limit switches 19 or 22 being actuated, the red pilot light 61 becomes energized to indicate a condition of abnormality which must be corrected before operation may be resumed. After the injection has been finished and the selector switch turned to the Off position, the pusher 14—15 is returned to its starting point by means of manual crank 7 and a new injection may be started.

As is apparent from the above discussion, it is also possible to provide a so-called Single injection operation of the device. This is accomplished by the setting of the selector switch 38 to the Single operation position. The adjustable timer switch 46 is pre-set in this case, the same as for the Continual type of operation by turning the knob 49. However, in this case it is first necessary to operate the Single push button 64 before the timer starts to rotate whereby the relay C is activated. When the timer thus energized trips the fixed timing switch 45 and stops, the pilot light 66 "Ready," as before, becomes energized. Energization of relay C will cause the main motor circuit control contact, $C_1$, to close as well as to effect the closing of its holding contact $C_2$. The injection is now completed by the drive motor 2 until, as before, the adjustable timer switch 46 is tripped by its cam 44 to interrupt the circuit for relay C. In order to repeat another Single injection, actuation of the push button 64 is again resorted to. The pilot light 60 as well as the red pilot light 61 function as in the previously discussed case.

The present embodiment, with the adjustable timer switch at its 100% setting and the device operating on a Continual cycle, permits the continuous forward movement of the propelling member 15 to the full length of the lead screw 8, so that a continuous injection emptying the contents of an ampule or syringe may be effected at any predetermined speed. When the adjustable timer switch is set at 100% and the selector switch as Single this permits an injection to take place over a period of time depending on the speed of the timing motor 43; thus with the timer motor revolving at 2 R. P. M. a full Single injection cycle with the timer switch at its 100% setting takes 30 seconds. The timing motor is provided with a magnetic or dynamic type brake in order to effect an instantaneous stoppage thereof. It may, at times, be convenient, to provide a remotely located additional push button or foot switch as 59 for the purpose of initiating an injection cycle.

It is also possible, due to the provision of the differential gearing 4, to move the piston both forward and backward by manual actuation as will be apparent from the above. This is necessary to bring the piston drive mechanism 15 and 16 to its initial position and into contact with the piston before starting an injection cycle, or in case of an emergency, for instance, whenever the power supply is not available.

One of the important aspects of the apparatus here described lies in the fact that, while the rate of output may be easily and precisely varied as desired, the rate of fluid ejection, that is, the speed of propulsion of the fluid ejecting piston, is constant. The need for this will be appreciated when it is realized that the quantities to be displaced must be accurately determinable in advance in accordance with medical requirements. This can be achieved, in one way, by the use of synchronous driving and timing motors operated at constant speeds depending upon the supply frequency. In other cases, some form of speed or voltage control may suggest itself to those skilled in the art, depending upon the facilities available.

The type of timer described in the present embodiment is, of course, disclosed for illustrative purposes only and may take other forms, such as electronic, mechanical, and other electromechanical combinations.

Although the preferred embodiment of this invention has been explained in detail, it is to be understood that changes in constructions and the substitution of equivalent portions thereof may be undertaken without departing from the spirit and scope of the invention as defined in the claims in this case.

We claim:

1. In a medical injection apparatus, the combination comprising: a stationary frame, a container for injectable fluid supported thereon and including an outlet, a discharge element movable in operative relation to said container for discharging said fluid, an electrical motor in driving relation to said element, and a control mechanism for said driving motor including timing means connected to said driving motor to energize and deenergize said driving motor periodically.

2. In a medical injection apparatus, as claimed in claim 1, wherein said timing means are adjustable to vary the duration of the operative and inoperative periods of said driving motor and include also means to effect the continual energization of said driving motor at one of its settings.

3. In a medical injection apparatus, as claimed in claim 1, wherein said control mechanism includes means for limiting the operativeness of said driving motor to a single operative period of said timing means, and a switch for repeated release of said single operative period of said timing means.

4. In a medical injection apparatus as claimed in claim 3, wherein said control mechanism includes also a selector switch for effecting a selection between continuous and periodic operativeness of the motor and its operation for one single operative period of said timing means.

5. In a medical injection apparatus as claimed in claim 1, wherein said timing means include a timing motor and a timing switch driven by said timing motor.

6. In a medical injection apparatus as claimed in claim 5, wherein said timing switch comprises a pair of cam operated switches at least one of which is rotatably adjustable to vary the duration of the operative and inoperative periods of said driving motor.

7. In a medical injection apparatus, the combination comprising: a stationary support, a container for injectable fluid supported thereon and including an outlet, a discharge element movable in operative relation to said container for discharging said fluid, an electrical motor in driving relation to said element, and a control mechanism for said driving motor, said control mechanism including timing means connected to said driving motor to energize and deenergize said driving motor periodically, said timing means being adjustable to vary the duration of the operative and inoperative periods of said driving motor and including means to effect the continual energization of said driving motor, means for limiting the operativeness of said driving motor to a single operative period of said timing means, a switch for effecting the repeated release of the single operative period of said timing means, and a selector switch for effecting a selection between continuous periodic operativeness of the motor and its operation for one single operative period of said timing means.

8. In a medical injection apparatus, the combination comprising: a stationary support, a syringe with injectable fluid supported thereon and provided with a piston, a discharge element movable in operative relation to said piston for discharging said fluid, an electrical motor in driving relation to said element, and a control mechanism for said driving motor including a timing motor, a timing switch driven by said timing motor and connected to said driving motor, said timing switch comprising a pair of cam operated switches, one of which is rotatably adjustable to vary the duration of the operative and inoperative periods of said driving motor and to effect the continuous operativeness of said motor at one of its settings, means for limiting the operativeness of said driving motor to a single operative period of said timing switch, a switch for repeated release of the single operative period of said timing switch, and a selector switch for effecting a selection between continuous and periodic operativeness of the motor and its operation for one single operative period of said timing switch.

9. In a motor driven medical injection apparatus for discharging fluids from a dischargeable container, comprising motor driven means for effecting the discharge of said container, a motor for driving said means at a constant speed, a holder for supporting said container in operative alignment with said motor driven means, timing means operatively associated with said motor for periodic energization of said motor, means for controlling the working stroke of said motor driven means, and means for limiting the operativeness of said motor driven means to a single working cycle of said timing means.

10. In a motor driven medical injection apparatus as claimed in claim 9, which further comprises means for effecting a continual and periodic operativeness of said motor driven means in respect to its working cycle, and means for effecting a selection between said single and said continual operativeness.

11. In a motor driven medical injection apparatus, as claimed in claim 9, wherein said timing means comprise an electric timing motor and switch means controlled thereby for controlling said electric driving motor, said switch means comprising a pair of cam operated switches, at least one of which is rotatably adjustable.

GEORGE B. GLASS.
JERZY I. BANDROWSKI.
ZBISLAW M. ROEHR.

REFERENCES CITED

The following references are of record in the file of this patent:

UNITED STATES PATENTS

| Number | Name | Date |
|---|---|---|
| 2,457,977 | Cookson | Jan. 4, 1949 |
| 2,498,672 | Glass | Feb. 28, 1950 |
| 2,502,676 | Smith | Apr. 4, 1950 |

FOREIGN PATENTS

| Number | Country | Date |
|---|---|---|
| 28,796 | Great Britain | Dec. 13, 1913 |